United States Patent
Ma et al.

(10) Patent No.: US 11,917,448 B2
(45) Date of Patent: Feb. 27, 2024

(54) METHOD AND APPARATUS FOR BEARER TRAFFIC MIGRATION IN MULTI-CONNECTIVITY SYSTEMS

(71) Applicant: ZTE CORPORATION, Guangdong (CN)

(72) Inventors: Zijiang Ma, Shenzhen (CN); Jing Liu, Shenzhen (CN); Yin Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 112 days.

(21) Appl. No.: 17/383,668

(22) Filed: Jul. 23, 2021

(65) Prior Publication Data

US 2021/0352518 A1 Nov. 11, 2021

Related U.S. Application Data

(63) Continuation of application No. PCT/CN2019/074062, filed on Jan. 31, 2019.

(51) Int. Cl.
*H04W 28/02* (2009.01)
*H04L 5/00* (2006.01)
(Continued)

(52) U.S. Cl.
CPC ....... *H04W 28/0252* (2013.01); *H04L 5/0032* (2013.01); *H04W 76/22* (2018.02); *H04W 36/0069* (2018.08)

(58) Field of Classification Search
CPC ............ H04L 5/0032; H04W 28/0252; H04W 36/0055; H04W 36/0061; H04W 36/0066;
(Continued)

(56) References Cited

U.S. PATENT DOCUMENTS

2016/0044540 A1 2/2016 He
2016/0373972 A1 12/2016 Vesely et al.
(Continued)

FOREIGN PATENT DOCUMENTS

CN 108781365 A 11/2018
WO WO-2018/144758 A1 8/2018
(Continued)

OTHER PUBLICATIONS

Extended European Search Report for EP Appl. No. 19913654.0, dated Jan. 20, 2022 (8 pages).
(Continued)

*Primary Examiner* — Pao Sinkantarakorn
(74) *Attorney, Agent, or Firm* — Foley & Lardner LLP

(57) ABSTRACT

A method and apparatus for forwarding data in wireless communication systems with multi-connectivity is disclosed. In one embodiment, a method for performing a data forwarding by a first wireless communication node, includes: receiving a first message from a first middle wireless communication node, wherein the first message comprises a first node identity of a second wireless communication node; determining a first connection for at least one first corresponding bearer between the first wireless communication node and the second wireless communication node according to the first node identity; transmitting a second message to the first middle wireless communication node, wherein the second message comprises at least one first data forwarding address of the first wireless communication node for the at least one first corresponding bearer; and receiving a third message from the second wireless communication node.

19 Claims, 5 Drawing Sheets

(51) Int. Cl.
*H04W 76/22* (2018.01)
*H04W 36/00* (2009.01)

(58) Field of Classification Search
CPC ......... H04W 36/0069; H04W 36/0077; H04W 36/18; H04W 76/22
See application file for complete search history.

(56) References Cited

U.S. PATENT DOCUMENTS

| | | | |
|---|---|---|---|
| 2017/0134998 A1* | 5/2017 | Xu | H04W 36/0061 |
| 2018/0035339 A1* | 2/2018 | Mitsui | H04W 36/08 |
| 2018/0063752 A1 | 3/2018 | Hahn et al. | |
| 2018/0176839 A1* | 6/2018 | Ohara | H04W 36/08 |
| 2018/0213450 A1* | 7/2018 | Futaki | H04W 36/0069 |
| 2020/0187064 A1* | 6/2020 | Susitaival | H04W 36/08 |

FOREIGN PATENT DOCUMENTS

| | | |
|---|---|---|
| WO | WO-2018/171588 A1 | 9/2018 |
| WO | WO-2018/202023 A1 | 11/2018 |
| WO | WO-2018/203300 A1 | 11/2018 |
| WO | WO-2018/219039 A1 | 12/2018 |

OTHER PUBLICATIONS

NTT Docomo, Inc., "Inter Master Node handover with Secondary Node change" 3GPP TSG-RAN3 Meeting #97, R3-173039, Aug. 25, 2017, Berlin, Germany (5 pages).
International Search Report and Written Opinion for PCT Appl. No. PCT/CN2019/074062, dated Oct. 30, 2019 (7 pages).
First Chinese Office Action for CN Appl. No. 201980079487.8, dated Jan. 9, 2023 (6 pages).
LG Electronics Inc., "Text Proposal for Tight interworking between new RAT and LTE" 3GPP TSG-RAN WG3 Meeting # Ad-hoc, R3-170003, Spokane, Washington, Jan. 12, 2017 (5 pages).

* cited by examiner

METHOD AND APPARATUS FOR BEARER TRAFFIC MIGRATION IN MULTI-CONNECTIVITY SYSTEMS

CROSS-REFERENCE TO RELATED APPLICATION

This application claims the benefit of priority under 35 U.S.C. § 120 as a continuation of PCT Patent Application No. PCT/CN2019/074062, filed on Jan. 31, 2019, the disclosure of which is incorporated herein by reference in its entirety.

TECHNICAL FIELD

This disclosure relates generally to wireless communications and, more particularly, to a method and apparatus for forwarding data in wireless communication systems with multi connectivity.

BACKGROUND

With a continuous increasing of global smartphone users, mobile data usage and traffic will continue to grow. In New Radio, dual connectivity (DC) are proposed to allow a wireless communication device with multiple transceivers to simultaneously receive data packet from at least two wireless communication nodes, for example a Master gNodeB (MgNB) and a secondary gNodeB (SgNB). In New Radio, a wireless communication device can perform measurement on intra-frequency, inter-frequency and inter-RAT (Radio Access Technology) frequencies. This frequency measurement by the wireless communication device is configured by a Master gNodeB and/or a Secondary gNodeB in order to facilitate mobility management or other radio resource management functions.

SUMMARY

The exemplary embodiments disclosed herein are directed to solving the issues related to one or more problems presented in the prior art, as well as providing additional features that will become readily apparent by reference to the following detailed description when taken in conjunction with the accompany drawings. In accordance with various embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In LTE dual connectivity (DC), a wireless communication device (UE) may have multiple serving cells belong to different wireless communication nodes (eNBs) including a primary eNB (MeNB) and at least one secondary eNB (SeNB), and a primary cell in a MeNB is named as a PCell and a primary cell in a SeNB is named as a PSCell. In new radio (NR) system, a similar DC architecture can be also introduced. In NR-DC, a UE can connect to multiple NR nodes (gNodeB or gNB) including a master gNB (MgNB) and at least one secondary gNB (SgNB or SN). Collectively in this present disclosure hereinafter, a Master Node (MN) is used to describe a MeNB and/or a MgNB; and a Secondary Node (SN) is used to describe a SeNB and a SgNB. Furthermore, serving cells within a MN are grouped together to form a Master Cell Group (MCG), and serving cells within a SN are grouped together to form a Secondary Cell Group (SCG). The MN and the at least one SN of a UE are grouped together to form a Radio Access Network (RAN).

A Protocol Data Unit (PDU) session is established between a core network (CN) and a RAN. The PDU session comprises a Quality of Service Flow (QF). In multi-connectivity, the QF of the PDU session can be further split into at least two separate parts which can be transmitted to the UE through different wireless communication nodes (e.g., MN and SN). The splitting of a QF of a PDU session is determined by the MN of a RAN. GPRS Tunnel Protocol User (GTP-U) Channel, i.e., User Plane (UP) connection, is established between the CN and each of the wireless communication node (e.g., MN and SN) with at least one part of the QF. When a part of a PDU session, a QF, or a bearer, hereinafter a bearer in the present disclosure, needs to be migrated from a source node to a target node through at least one middle node, the bearer is typically migrated through the at least one middle node since the source node and the target node do not have knowledge of a direct radio link connection on the UP. Due to the bear traffic migration through the at least one middle node, this process can cause delay. Therefore, there exists a need to develop a method and apparatus for bear traffic migration in wireless communication systems with multi connectivity so as to improve reliability and reduce time delay.

In one embodiment, a method for performing a data forwarding by a first wireless communication node, includes: receiving a first message from a first middle wireless communication node, wherein the first message comprises a first node identity of a second wireless communication node; determining a first connection for at least one first corresponding bearer between the first wireless communication node and the second wireless communication node according to the first node identity; transmitting a second message to the first middle wireless communication node, wherein the second message comprises at least one first data forwarding address of the first wireless communication node for the at least one first corresponding bearer; and receiving a third message from the second wireless communication node.

In a further embodiment, a method for performing a data forwarding by a first wireless communication node, includes: receiving a first message from a first middle wireless communication node, wherein the first message comprises at least one first data forwarding address of a second wireless communication node for at least one first corresponding bearer; and transmitting a second message to the second wireless communication node according to the at least one first data forwarding address, wherein the at least one one first data forwarding address is determined by the second wireless communication node according to a first node identity of the first wireless communication node.

Yet in another embodiment, a computing device comprising at least one processor and a memory coupled to the processor, the at least one processor configured to carry out the method.

Yet, in another embodiment, a non-transitory computer-readable medium having stored thereon computer-executable instructions for carrying out the method.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION

Figure 1A:
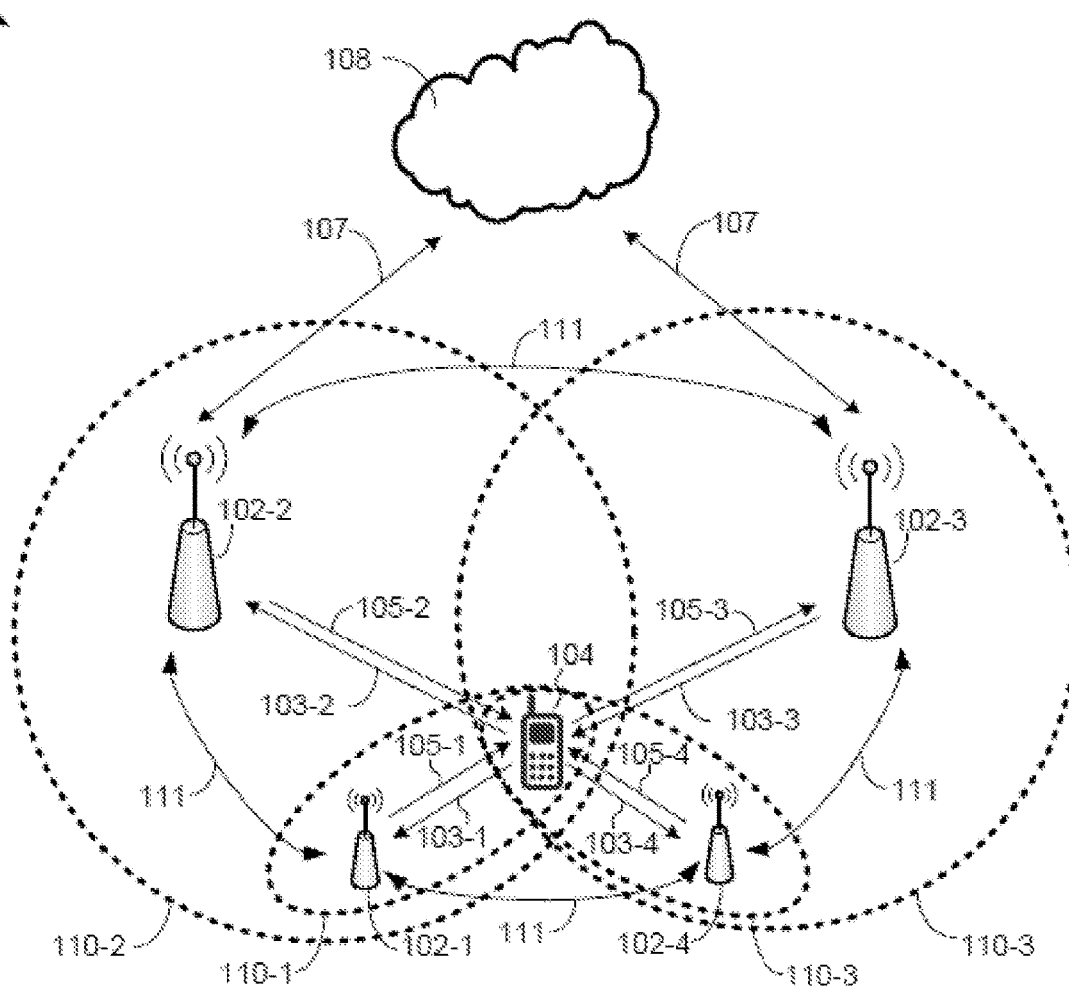
FIG. 1A illustrates an exemplary wireless communication network, in accordance with some embodiments of the present disclosure.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates an exemplary wireless communication network 100, in accordance with some embodiments of the present disclosure. In a wireless communication system, a network side communication node or a base station (BS) 102 can be a node B, an E-UTRA Node B (also known as Evolved Node B, eNodeB or eNB), a gNodeB (also known as gNB) in new radio (NR) technology, a pico station, a femto station, or the like. A terminal side communication device or a user equipment (UE) 104 can be a long range communication system like a mobile phone, a smart phone, a personal digital assistant (PDA), tablet, laptop computer, or a short range communication system such as, for example a wearable device, a vehicle with a vehicular communication system and the like. A network communication node and a terminal side communication device are represented by a BS 102 and a UE 104, respectively, and in all the embodiments in this disclosure hereafter, and are generally referred to as "communication nodes" and "communication device" herein. Such communication nodes and communication devices may be capable of wireless and/or wired communications, in accordance with various embodiments of the invention. It is noted that all the embodiments are merely preferred examples, and are not intended to limit the present disclosure. Accordingly, it is understood that the system may include any desired combination of BSs 102 and UEs 104, while remaining within the scope of the present disclosure.

Referring to FIG. 1A, the wireless communication network 100 includes a first BS 102-1, a second BS 102-2, a third BS 102-3, a fourth BS 102-4, and a UE 104. In some embodiments, the UE 104 forms direct communication (i.e., uplink) channels 103-1, 103-2, 103-3, and 103-4 with the first BS 102-1, the second BS 102-2, the third BS 102-3, and the fourth BS 102-4, respectively. In some embodiments, the UE 104 also forms direct communication (i.e., downlink) channels 105-1, 105-2, 105-3, and 105-4 with the first BS 102-1, the second BS 102-2, the third BS 102-3, and the fourth BS 102-4, respectively. The direct communication channels between the UE 104 and the BS 102 can be through interfaces such as an Uu interface, which is also known as E-UTRAN air interface. In some embodiments, the UE 104 comprises a plurality of transceivers which enables the UE 104 to support multi connectivity so as to receive data simultaneously from the first BS 102-1, the second BS 102-2, the third BS 102-3, and the fourth BS 102-4. The first BS 102-1, the second BS 102-2, the third BS 102-3, and the fourth BS 102-4 each is connected to a core network (CN) 108 on a user plane (UP) through an external interface 107, e.g., an Iu interface, an NG-U interface, or an S1-U interface. Only the second BS 102-2 and the third BS 102-3 are directly connected to the CN 108 on a control plane (CP), e.g., an S1-MME interface. In the illustrated embodiment, the second BS 102-2 and the third BS 102-3 each is a Master Node (MN), which is connected to the CN 108 through both the CP and UP; and the first BS 102-1 and the fourth BS 102-4 each is a Secondary Node (SN), which is also connected to the CN 108 through the UP. In some embodiments, the CN 108 further comprises at least one of the following: Access and Mobility Management Function (AMF), User Plane Function (UPF), and System Management Function (SMF).

When the first BS 102-1 and the second BS 102-2 each is a gNB, the direct communication between the first BS 102-1 and the second BS 102-2 on the UP and CP is through an Xn-U interface and an Xn-C interface, respectively. When the third BS 102-3 and the fourth BS 102-4 each is a gNB, the direct communication between the first BS 102-1 and the second BS 102-2 on the UP and CP is through an Xn-U interface and an Xn-C interface, respectively. The second BS 102-2 and the third BS 102-3 are neighboring B Ss. A first serving cell 110-1 is covered by the first BS 102-1; the second serving cell 110-2 is covered by the second BS 102-2; a third serving cell 110-3 is covered by the third BS 102-3; and the fourth serving cell 110-4 is covered by the fourth BS 102-4. In some embodiments, the second cell 110-2 is a primary cell of the NN (i.e., the second BS 102-2), known as PCell, and the first cell 110-1 is a primary cell of the SN (i.e., the first BS 102-1), known as PSCell. In some embodiments, the first cell 110-1 and the second cell 110-2 are neighboring cells.

A direct communication channel 111 between the first BS 102-1 (eNB) and the second 102-2 (gNB) is through an X2 interface. Similarly, the direct communication channels 111 between the second and the third BS, the third and the fourth BS, the fourth and the first BS can be an X2 interface or a Xn interface. In some embodiments, a BS (gNB) is split into a Distributed Unit (DU) and a Central Unit (CU), between which the direct communication is through a F1 interface. In some embodiments, a CU of the second BS 102-2 can be further split into a Control Plane (CP) and a User Plane (UP), between which the direct communication is through an E1 interface. Hereinafter in the present disclosure, an Xx interface is used to describe one of the following interfaces, the NG interface, the S1 interface, the X2 interface, the Xn interface, the F1 interface, and the E1 interface. When an Xx interface is established between two nodes, the two nodes can transmit control signaling on the CP and/or data on the UP.

Figure 1B:
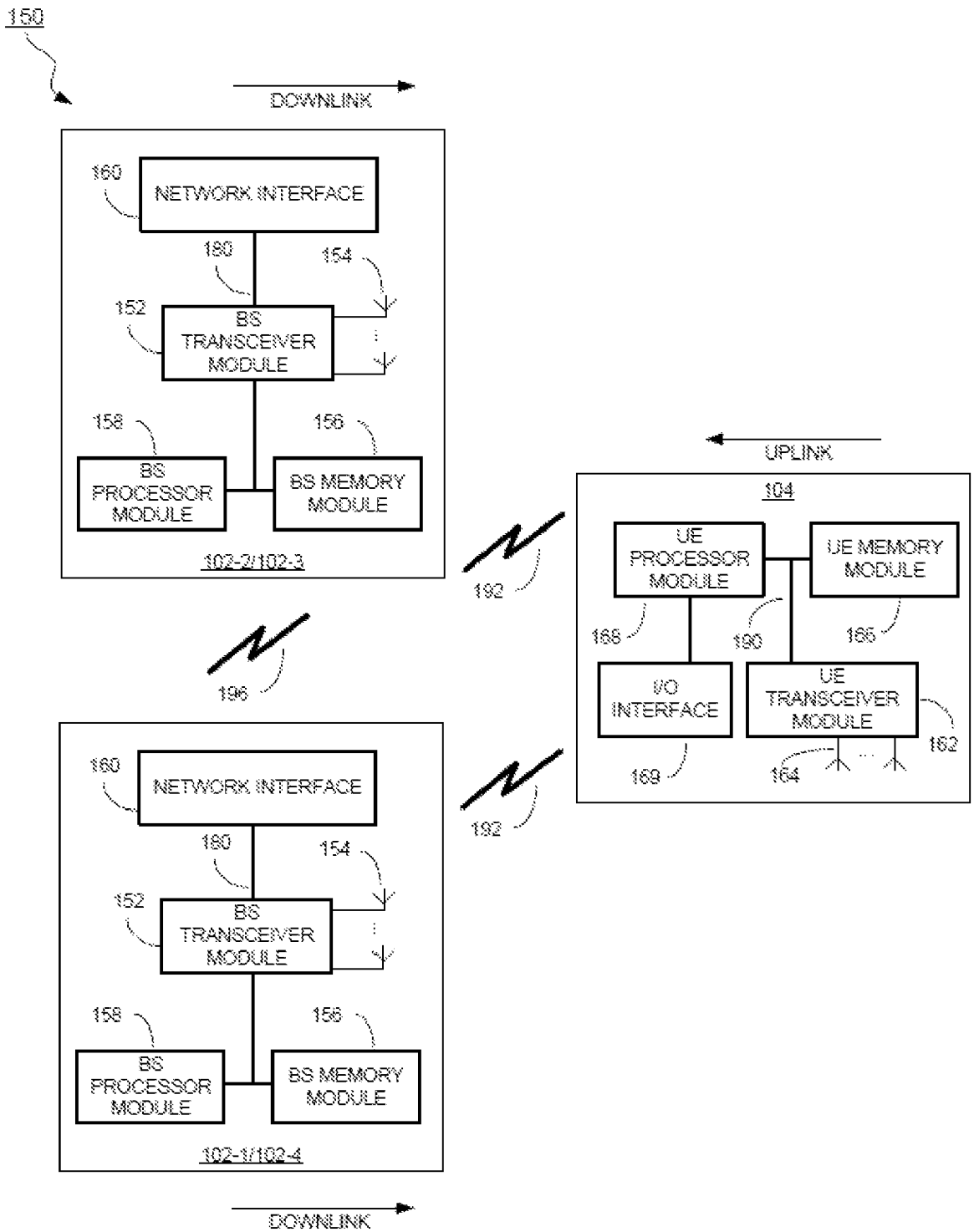
FIG. 1B illustrates a block diagram of an exemplary wireless communication system, in accordance with some embodiments of the present disclosure.

FIG. 1B illustrates a block diagram of an exemplary wireless communication system 150, in accordance with some embodiments of the present disclosure. The system 150 may include components and elements configured to support known or conventional operating features that need not be described in detail herein. In some embodiments, the system 150 can be used to transmit and receive data symbols in a wireless communication environment such as the wireless communication network 100 of FIG. 1A, as described above.

The system 150 generally includes a first BS 102-1, a second BS 102-2, and a UE 104, collectively referred to as BS 102 and UE 104 below for ease of discussion. The first BS 102-1 and the second BS 102-2 each comprises a BS transceiver module 152, a BS antenna array 154, a BS memory module 156, a BS processor module 158, and a network interface 160. In the illustrated embodiment, each module of the BS 102 are coupled and interconnected with one another as necessary via a data communication bus 180. The UE 104 comprises a UE transceiver module 162, a UE antenna 164, a UE memory module 166, a UE processor module 168, and an I/O interface 169. In the illustrated embodiment, each module of the UE 104 are coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, the system 150 may further include any number of modules other than the modules shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink (UL) transmission, and a wireless transmission from a transmitting antenna of the BS 102 to a receiving antenna of the UE 104 is known as a downlink (DL) transmission. In accordance with some embodiments, the UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. Preferably, there is close synchronization timing with only a minimal guard time between changes in duplex direction. The UE transceiver 162 communicates through the UE antenna 164 with the BS 102 via the wireless communication channel 192. The BS transceiver 152 communications through the BS antenna 154 of a BS (e.g., the first BS 102-1) with the other BS (e.g., the second BS 102-2) via a wireless communication channel 196. The wireless communication channel 196 can be any wireless channel or other medium known in the art suitable for direct communication between BSs.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some exemplary embodiments, the UE transceiver 162 and the BS transceiver 152 are configured to support industry standards such as the Long Term Evolution (LTE) and emerging 5G standards (e.g., NR), and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The processor modules 158 and 168 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor module may be realized as a microprocessor, a controller, a microcontroller, a state machine, or the like. A processor module may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. The memory modules 156 and 166 may also each include non-volatile memory for storing instructions to be executed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or a CN over a wired or wireless connection.

Referring again to FIG. 1A, as mentioned above, the BS 102 repeatedly broadcasts system information associated with the BS 102 to one or more UEs 104 so as to allow the UEs 104 to access the network within the cells (e.g., 110-1 for the first BS 102-1 and 110-2 for the second BS 102-2) where the BS 102 is located, and in general, to operate properly within the cell. Plural information such as, for example, downlink and uplink cell bandwidths, downlink and uplink configuration, cell information, configuration for random access, etc., can be included in the system information, which will be discussed in further detail below. Typically, the BS 102 broadcasts a first signal carrying some major system information, for example, configuration of the cell 110 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)).

Referring again to FIG. 1B, in some embodiments, the major system information carried by the first broadcast signal may be transmitted by the BS 102 in a symbol format via the communication channel 192 (e.g., a PBCH). In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (de-mapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

Figure 2:
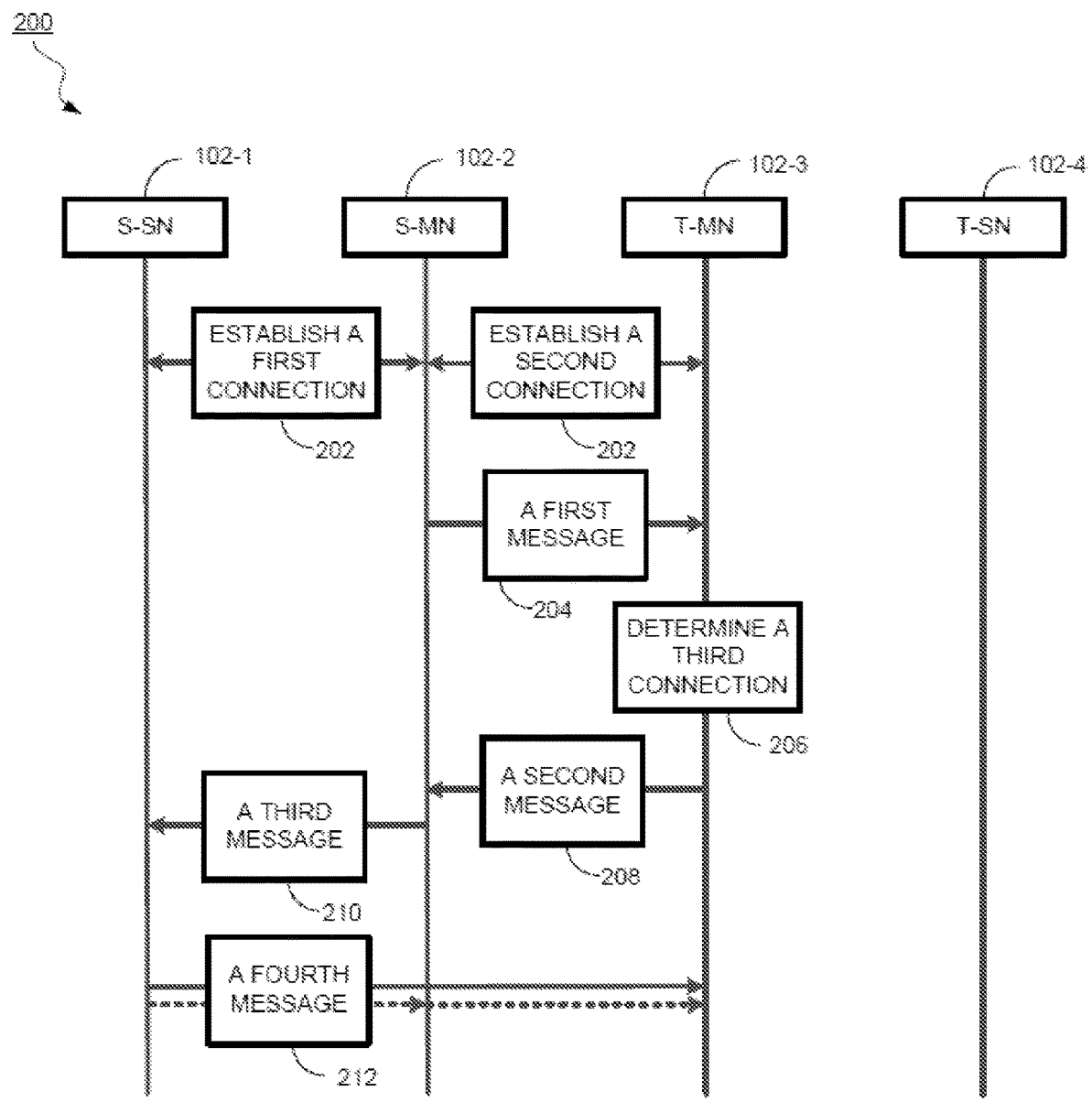
FIG. 2 illustrates a method for bearer traffic migration in a wireless communication system with multi connectivity, in accordance with some embodiments of the present disclosure.

FIG. 2 illustrates a method 200 for bearer traffic migration in a wireless communication system with multi connectivity, in accordance with some embodiments of the present disclosure. It is understood that additional operations may be provided before, during, and after the method 200 of FIG. 2, and that some operations may be omitted or reordered. The communication system in the illustrated embodiment comprises a first BS 102-1, a second BS 102-2, a third BS 102-3, and a fourth BS 102-4. In the illustrated embodiments, a UE 104 (not shown) is in one of at least one serving cell covered by the first BS 102-1, in one of at least one serving cell covered by the second BS 102-2, in one of at least one serving cell covered by the third BS 102-3 and in one of at least one serving cell covered by the fourth BS 102-4, i.e., the UE 104 is in connection with the first BS 102-1, the second BS 102-2, the third BS 102-3, and the fourth BS 102-4. In some embodiments, the first BS 102-1 is a source secondary wireless communication node (S-SN), the second BS 102-2 is a source primary wireless communication node (S-MN), the third BS 102-3 is a target primary wireless communication node (T-MN), and the fourth BS 102-4 is a target secondary wireless communication node (T-SN). In the illustrated embodiments, at least one bearer, or at least one PDU session, or at least one QF of a PDU session, which is determined to be migrated to the third BS 102-3 (T-MN), is initially configured on the first BS 102-1 (S-SN). In some embodiments, the first BS 102-1, the second BS 102-2, the third BS 102-3, and the fourth BS 102-4 each is one of the following: a NB, a gNB, an eNB, an en-gNB, an EN-DC eNB, a CN, a unit of a CN (e.g., AMF, UPF, and SMF), a DU, a CU, a CU-CP, and a CU-UP. FIG. 2 with 4 nodes is for illustration purposes and is not intend to be limiting. It should be noted that that any numbers of BS 102 can be used; any numbers of PDU sessions can exists; and any numbers of PDU sessions can be removed from any nodes, which are all within the scope of this invention.

The method 200 starts with operation 202 in which a first connection and a second connection are established according to some embodiments. In the illustrated embodiment, the first connection is established between the first BS 102-1 and the second BS 102-2 through an Xx interface, and the second connection is established between the second BS 102-2 and the third BS 102-3 through an Xx interface, wherein the Xx interface is one of the following: an X2 interface, an Xn interface, a S1 interface, an Ng interface, an E1 interface or a F1 interface. In some embodiments, the first connection and the second connection each is established through one of the following procedures: a EN-DC X2 setup procedure, a X2 setup procedure and a Xn setup procedure, a Ng setup procedure, an F1 setup procedure, an E1 setup procedure. The first and second connections allow control signaling transmission on the CP and data transmission on the UP between two corresponding nodes.

In some embodiments, when an Xx interface is established between 2 nodes, node identities of the 2 nodes are known to both 2 nodes. Specifically, after the first connection is established, a first node identity of the first BS 102-1 is obtained by the second BS 102-2 and a second node identity of the second BS 102-2 is obtained by the first BS 102-1. Similarly, after the second connection is established, the second node identity of the second BS 102-2 is obtained by the third BS 102-3 and a third node identity of the third BS 102-3 is obtained by the second BS 102-2. In some embodiments, a node identity comprises a global node identity (GNID). In some embodiments, when a BS (gNB) is split into DU and a CU, the node identity further comprises one of the following: a gNB-CU-CP identity and a gNB-CU-UP identity.

The method 200 continues with operation 204 in which a first message is transmitted from the second BS 102-2 to the third BS 102-3 according to some embodiments. In some embodiments, the first message is a control message transmitted on the CP of the first connection. In some embodiments, the first message is a handover request message. In some embodiments, the first message comprises the first node identity of the first BS 102-1. In some embodiments, the first message further comprises information of the at least one first bearer to be migrated from the first BS 102-1 to the third BS 102-3.

The method 200 continues with operation 206 in which whether a third connection is established is determined by the third BS 102-3 according to some embodiments. In some embodiments, when the first node identity of the first BS 102-1 is received by the third BS 102-3 in the first message from the second BS 102-2, the third connection between the first BS 102-1 and the third BS 102-3 is determined by the third BS 102-3 according to the first node identity of the first BS 102-1. In some embodiments, the third connection is a connection on the UP through an Xx interface.

The method 200 continues with operation 208 in which a second message is received by the second BS 102-2 from the third BS 102-3 according to some embodiments. In some embodiments, the second message is transmitted on the CP of the second connection. In some embodiments, the second message is a handover request acknowledgement message. In some embodiments, the second message comprises an indicator, wherein the indicator is configured to indicate whether the third connection is established between the first BS 102-1 and the third BS 102-3. In some embodiments, the indicator comprises 1 bit. For example, when a value of the indicator is 1, the third connection is established between the first BS 102-1 and the third BS 102-3; and when the value of the indicator is 0, the third connection is unestablished between the first BS 102-1 and the third BS 102-3.

In some embodiments, the second message further comprises at least one first data forwarding address of the third BS 102-3 for the at least one bearer. In some embodiments, the at least one first data forwarding address of the third BS 102-3 is configured by the third BS 102-3. In some embodiments, the second message further comprises the information of the at least one bearer. In some embodiments, the at least one first data forwarding address each comprises one of the following: information of a General Packet Radio Services (GPRS) tunneling protocol stack for uploading (UL) data forwarding and information of a GPRS tunneling protocol stack for downloading (DL) data forwarding. In some embodiments, the information of a GPRS tunneling protocol stack comprises at least one of the following: a Transport Network Layer (TNL) address, and a tunneling endpoint identifier (TEID) of the GPRS tunneling protocol stack.

The method 200 continues with operation 210 in which a third message is transmitted from the second BS 102-2 to the first BS 102-1 according to some embodiments. In some embodiments, the third message is transmitted on the CP of the first connection. In some embodiments, the third message is a SN release message. In some other embodiments, the third message is an Xn-U address indication message. In some embodiments, the third message comprises at least one second data forwarding address of the third BS 102-3 for the at least one bearer. In some embodiments, the at least one second data forwarding address is configured by the second BS 102-2. In some embodiments, when the third connection is established between the first BS 102-1 and the third BS 102-3, the at least one third data forwarding address of the third BS 102-3 configured by the second BS 102-2 is the same as the first data forwarding address of the third BS 102-3 configured by the third BS 102-3; and when the third connection is unestablished between the first BS 102-1 and the third BS 102-3, the at least one second data forwarding address of the third BS 102-3 configured by the second BS 102-2 is different from the first data forwarding address of the third BS 102-3 configured by the third BS 102-3. In some embodiments, the third message further comprises the information of the at least one bearer.

The method 200 continues with operation 212 in which a fourth message is transmitted from the first BS 102-1 to the third BS 102-3 according to some embodiments. In some embodiments, the fourth message is transmitted on the UP of the third connection. In some embodiments, the fourth message comprises data on the at least one bearer to be migrated to the third BS 102-3. In some embodiments, when the third connection between the first BS 102-1 and the third BS 102-3 is established, the fourth message is transmitted according to the at least one first data forwarding address of the third BS 102-3 In some embodiments, when the third connection is unestablished, the third message is transmitted on the UP of the first connection from the first BS 102-1 to the second BS 102-2 and further to the third BS 102-3 through the second connection according to the at least one second data forwarding address configured by the second BS 102-2.

Figure 3:
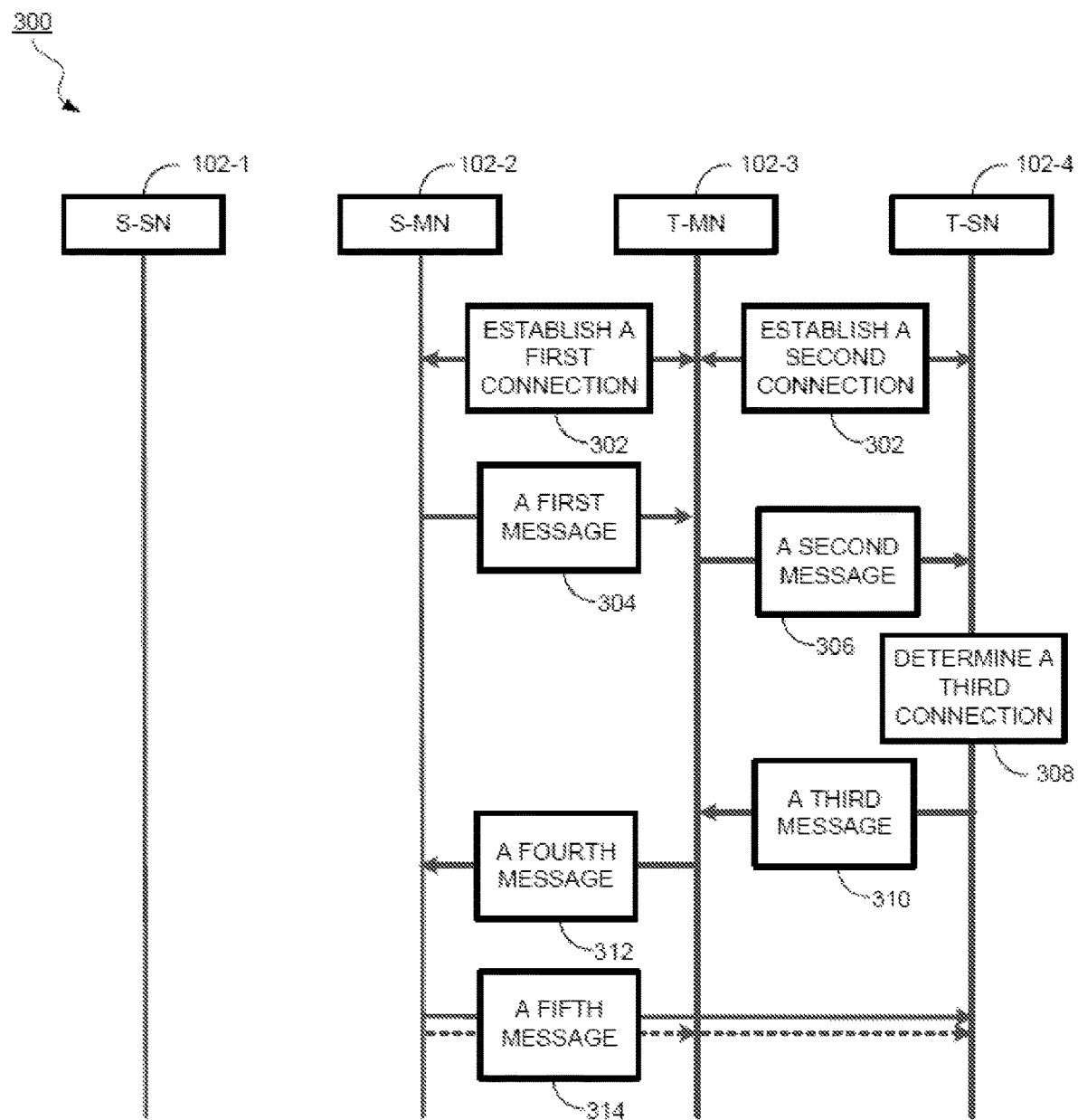
FIG. 3 illustrates a method for bearer traffic migration in a wireless communication system with multi connectivity, in accordance with some embodiments of the present disclosure.

FIG. 3 illustrates a method 300 for bearer traffic migration in a wireless communication system with multi connectivity, in accordance with some embodiments of the present disclosure. It is understood that additional operations may be provided before, during, and after the method 300 of FIG. 3, and that some operations may be omitted or reordered. The communication system in the illustrated embodiment comprises a first BS 102-1, a second BS 102-2, a third BS 102-3, and a fourth BS 102-4. In the illustrated embodiments, a UE 104 (not shown) is in one of at least one serving cell covered by the first BS 102-1, in one of at least one serving cell covered by the second BS 102-2, in one of at least one serving cell covered by the third BS 102-3 and in one of at least one serving cell covered by the fourth BS 102-4, i.e., the UE 104 is in connection with the first BS 102-1, the second BS 102-2, the third BS 102-3, and the fourth BS 102-4. In some embodiments, the first BS 102-1 is a source secondary wireless communication node (S-SN), the second BS 102-2 is a source primary wireless communication node (S-MN), the third BS 102-3 is a target primary wireless communication node (T-MN), and the fourth BS 102-4 is a target secondary wireless communication node (T-SN). In the illustrated embodiments, at least one bearer, or at least one PDU session, or at least one QF of a PDU session, which is determined to be migrated to the fourth BS 102-3 (T-SN), is initially configured on the second BS 102-2 (S-TN). In some embodiments, the first BS 102-1, the second BS 102-2, the third BS 102-3, and the fourth BS 102-4 each is one of the following: a NB, a gNB, an eNB, an en-gNB, an EN-DC eNB, a CN, a unit of a CN (e.g., AMF, UPF, and SMF), a DU, a CU, a CU-CP, and a CU-UP. FIG. 2 with 4 nodes is for illustration purposes and is not intend to be limiting. It should be noted that that any numbers of BS 102 can be used; any numbers of PDU sessions can exists; and any numbers of PDU sessions can be removed from any nodes, which are all within the scope of this invention.

The method 300 starts with operation 302 in which a first connection and a second connection are established according to some embodiments. In the illustrated embodiment, the first connection is established between the second BS 102-2 and the third BS 102-3 through an Xx interface, and the second connection is established between the third BS 102-3 and the fourth BS 102-4 through an Xx interface, wherein the Xx interface is one of the following: an X2 interface, an Xn interface, a S1 interface, an Ng interface, an E1 interface, and a F1 interface. In some embodiments, the first connection and the second connection each is established through one of the following: an EN-DC X2 setup procedure, an X2 setup procedure, and an Xn setup procedure, an Ng setup procedure, an F1 setup procedure, an E1 setup procedure. The first and second connections allow control signaling transmission on the CP and data transmission on the UP between two corresponding nodes.

In some embodiments, when an Xx interface is established between 2 BS's, node identities of the 2 BS's are known to each other. Specifically, after the first connection is established, a first node identity of the second BS 102-2 is obtained by the third BS 102-3 and a second node identity of the third BS 102-3 is obtained by the second BS 102-2. Similarly, after the second connection is established, the second node identity of the third BS 102-3 is obtained by the fourth BS 102-4 and a third node identity of the fourth BS 102-4 is obtained by the third BS 102-3. In some embodiments, a node identity comprises a global node identity (GNID). In some embodiments, when a BS (gNB) is split into DU and a CU, the node identity further comprises one of the following: a gNB-CU-CP identity and a gNB-CU-UP identity.

The method 300 continues with operation 304 in which a first message is transmitted from the second BS 102-2 to the third BS 102-3 according to some embodiments. In some embodiments, the first message is a control message transmitted on the CP of the first connection. In some embodiments, the first message is a handover request message. In some embodiments, the first message further comprises information of the at least one bearer to be migrated from the second BS 102-2 to the third BS 102-3. In some embodiments, when the information of the at least one bearer is received in the first message, the third BS 102-3 further determines the at least one first bearer is to be migrated to the fourth BS 102-4 according to the information of the at least one first bearer and a status of the fourth BS 102-4.

The method 300 continues with operation 306 in which a second message is transmitted from the third BS 102-3 to the fourth BS 102-4 according to some embodiments. In some embodiments, the second message is transmitted on the CP of the second connection. In embodiments, the second message is a SN addition request message. In some embodiments, the second message comprises the first node identity of the second BS 102-2. In some embodiments, the second message further comprises the information of the at least one bearer to be migrated from the second BS 102-2 to the fourth BS 102-4.

The method 300 continues with operation 308 in which whether a third connection is established is determined by the fourth BS 102-4 according to some embodiments. In some embodiments, when the first node identity of the second BS 102-2 is received by the fourth BS 102-4 in the second message from the third BS 102-3, the third connection between the second BS 102-2 and the fourth BS 102-4 is determined by the fourth BS 102-4 according to the first node identity of the second BS 102-2. In some embodiments, the third connection is a connection on the UP through an Xx interface.

The method 300 continues with operation 310 in which a third message is received by the third BS 102-3 from the fourth BS 102-4 according to some embodiments. In some embodiments, the third message is transmitted on the CP of the second connection. In some embodiments, the third message is a SN addition request acknowledgement message. In some embodiments, the third message comprises an indicator, wherein the indicator is configured to indicate whether the third connection is established between the second BS 102-2 and the fourth BS 102-4. In some embodiments, the third connect between the second BS 102-2 and the fourth BS 102-4 for the at least one bearer is determined according to the first node identity of the second BS 102-2 received from the third BS 102-3 in the second message. In some embodiments, the third message further comprises at least one first data forwarding address of the fourth BS 102-4 for the at least one bearer. In some embodiments, the at least one first data forwarding address of the fourth BS 102-4 is configured by the fourth BS 102-4. In some embodiments, the fourth message further comprises the information of the at least one bearer. In some embodiments, the at least one first data forwarding address each comprises one of the following: information of a General Packet Radio Services (GPRS) tunneling protocol stack for uploading (UL) data forwarding and information of a GPRS tunneling protocol stack for downloading (DL) data forwarding. In some embodiments, the information of a GPRS tunneling protocol stack comprises at least one of the following: a Transport Network Layer (TNL) address, and a tunneling endpoint identifier (TED) of the GPRS tunneling protocol stack.

In some embodiments, the indicator comprises 1 bit. For example, when a value of the indicator is 1, the third connection is established between the second BS 102-2 and the fourth BS 102-4; and when the value of the indicator is 0, the third connection is unestablished between the second BS 102-2 and the fourth BS 102-4.

The method 300 continues with operation 312 in which a fourth message is transmitted from the third BS 102-3 to the second BS 102-2 according to some embodiments. In some embodiments, the fourth message is transmitted on the CP of the first connection. In some embodiments, the fourth message is a handover request acknowledgement message. In some embodiments, the fourth message comprises at least one second data forwarding address of the fourth BS 102-4 for the at least one bearer. In some embodiments, the at least one second data forwarding address is configured by the third BS 102-3. In some embodiments, when the third connection is established between the second BS 102-2 and the fourth BS 102-4, the at least one second data forwarding address of the fourth BS 102-4 configured by the third BS 102-3 is the same as the first data forwarding address of the fourth BS 102-4 configured by the fourth BS 102-4; and when the third connection is unestablished between the second BS 102-2 and the fourth BS 102-4 for a bearer, the at least one second data forwarding address of the fourth BS 102-4 configured by the third BS 102-3 each is different from the at least one first data forwarding address of the fourth BS 102-4 configured by the fourth BS 102-4. In some embodiments, the fourth message further comprises the information of the at least one bearer.

The method 300 continues with operation 314 in which a fifth message is transmitted from the second BS 102-2 to the fourth BS 102-4 according to some embodiments. In some embodiments, the fifth message is transmitted on the UP of the third connection. In some embodiments, the fifth message comprises data on the at least one bearer to be migrated to the fourth BS 102-4. In some embodiments, when the third connection between the second BS 102-2 and the fourth BS 102-4 is established, the fifth message is transmitted according to the at least one first data forwarding address of the fourth BS 102-4. In some embodiments, when the third connection is unestablished, the fifth message is transmitted on the UP of the first connection from the second BS 102-2 to the third BS 102-3 and further to the fourth BS 102-4 through the second connection according to the at least one second data forwarding address configured by the third BS 102-3.

Figure 4:
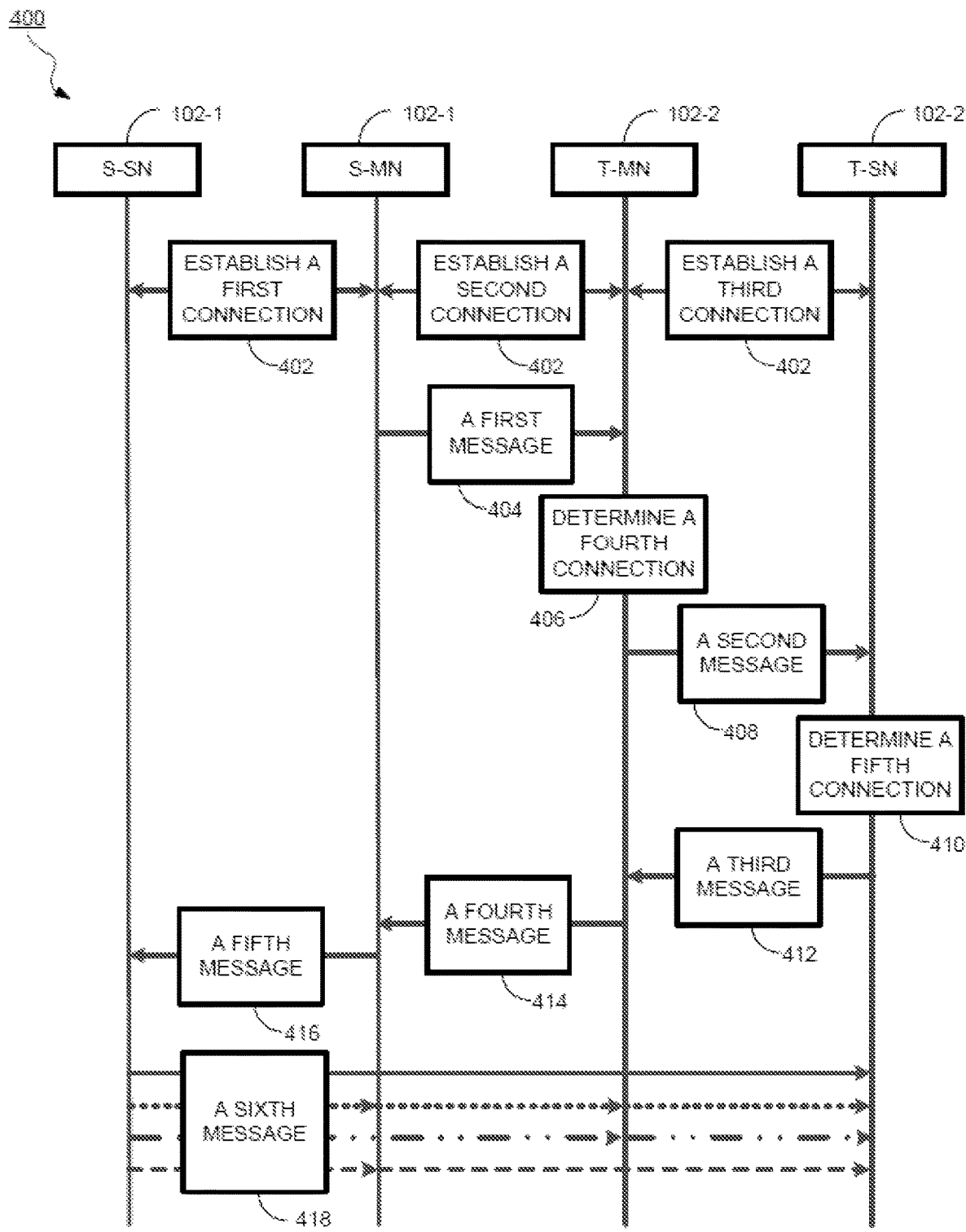
FIG. 4 illustrates a method for bearer traffic migration in a wireless communication system with multi connectivity, in accordance with some embodiments of the present disclosure.

FIG. 4 illustrates a method 400 for bearer traffic migration in a wireless communication system with multi connectivity, in accordance with some embodiments of the present disclosure. It is understood that additional operations may be provided before, during, and after the method 400 of FIG. 4, and that some operations may be omitted or reordered. The communication system in the illustrated embodiment comprises a first BS 102-1, a second BS 102-2, a third BS 102-3, and a fourth BS 102-4. In the illustrated embodiments, a UE 104 (not shown) is in one of at least one serving cell covered by the first BS 102-1, in one of at least one serving cell covered by the second BS 102-2, in one of at least one serving cell covered by the third BS 102-3 and in one of at least one serving cell covered by the fourth BS 102-4, i.e., the UE 104 is in connection with the first BS 102-1, the second BS 102-2, the third BS 102-3, and the fourth BS 102-4. In some embodiments, the first BS 102-1 is a source secondary wireless communication node (S-SN), the second BS 102-2 is a source primary wireless communication node (S-MN), the third BS 102-3 is a target primary wireless communication node (T-MN), and the fourth BS 102-4 is a target secondary wireless communication node (T-SN). In the illustrated embodiments, at least one bearer, or at least one PDU session, or at least one QF of a PDU session, which is determined to be migrated to the fourth BS 102-4 (T-SN), is initially configured on the first BS 102-1 (S-SN). In some embodiments, the first BS 102-1, the second BS 102-2, the third BS 102-3, and the fourth BS 102-4 each is one of the following: a NB, a gNB, an eNB, an en-gNB, an EN-DC eNB, a CN, a unit of a CN (e.g., AMF, UPF, and SMF), a DU, a CU, a CU-CP, and a CU-UP. FIG. 2 with 4 nodes is for illustration purposes and is not intend to be limiting. It should be noted that that any numbers of BS 102 can be used; any numbers of PDU sessions can exists; and any numbers of PDU sessions can be removed from any nodes, which are all within the scope of this invention.

The method 400 starts with operation 402 in which a first connection, a second connection and a third connection are established according to some embodiments. In the illustrated embodiment, the first connection is established between the first BS 102-1 and the second BS 102-2 through an Xx interface; the second connection is established between the second BS 102-2 and the third BS 102-3 through an Xx interface; and the third connection is established between the third BS 102-3 and the fourth BS 102-4 through an Xx interface. In some embodiments, the Xx interface is one of the following: an X2 interface, an Xn interface, a S1 interface, an Ng interface, an E1 interface, and a F1 interface. In some embodiments, the first connection, the second connection, and the third connection each is established through one of the following: an EN-DC X2 setup procedure, an X2 setup procedure, and an Xn setup procedure, an Ng setup procedure, an F1 setup procedure, an E1 setup procedure. The first, second and third connections allow control signaling transmission on the CP and data transmission on the UP between two corresponding nodes.

In some embodiments, when an Xx interface is established between 2 BS's, node identities of the 2 BS's are known to each other. Specifically, after the first connection is established, a first node identity of the first BS 102-1 is obtained by the second BS 102-2, a second node identity of the second BS 102-2 is obtained by the first BS 102-1. Similarly, after the second connection is established, the second node identity of the second BS 102-2 is obtained by the third BS 102-3, and a third node identity of the third BS 102-3 is obtained by the second BS 102-2. Similarly, after the third connection is established, the third node identity of the third BS 102-3 is obtained by the fourth BS 102-4, and a fourth node identity of the fourth BS 102-4 is obtained by the third BS 102-3. In some embodiments, a node identity comprises a global node identity (GNID). In some embodiments, when a BS (gNB) is split into DU and a CU, the node identity further comprises at least one of the following: a gNB-CU-CP identity and a gNB-CU-UP identity.

The method 400 continues with operation 404 in which a first message is transmitted from the second BS 102-2 to the third BS 102-3 according to some embodiments. In some embodiments, the first message is a control message on the CP. In some embodiments, the first message is a handover request message. In some embodiments, the first message comprises the first node identity of the first BS 102-1. In some embodiments, the first message further comprises information of the at least one first bearer to be migrated from the first BS 102-1 to the fourth BS 102-4. In some embodiments, the first message further comprises a second node identity of the second BS 102-2 and information of at least one second bearer to be migrated from the second BS 102-2 to the fourth BS 102-4.

The method 400 continues with operation 406 in which whether a fourth connection is established is determined by the third BS 102-3 according to some embodiments. In some embodiments, when the first node identity of the first BS 102-1 is received by the third BS 102-3 in the first message from the second BS 102-2, the fourth connection between the first BS 102-1 and the third BS 102-3 is determined by the third BS 102-3 according to the first node identity of the first BS 102-1. In some embodiments, when the information of the at least one first bearer is received in the first message, the third BS 102-3 further determines the at least one first bearer is to be migrated to the fourth BS 102-4 according to the information of the at least one first bearer and a status of the fourth BS 102-4. In some embodiments, the fourth connection is a connection on the UP through an Xx interface.

The method 400 continues with operation 408 in which a second message is transmitted from the third BS 102-3 to the fourth BS 102-4 according to some embodiments. In some embodiments, the second message is transmitted on the CP.

In some embodiments, the second message is a SN addition request message. In some embodiments, the second message comprises the first node identity of the first BS 102-1 and the information of the at least one first bearer. In some embodiments, the second message further comprises the second node identity of the second BS 102-2 and the information of the at least one second bearer.

The method 400 continues with operation 410 in which whether a fifth connection is established is determined by the fourth BS 102-4 according to some embodiments. In some embodiments, when the first node identity of the first BS 102-1 is received by the fourth BS 102-4 in the second message from the third BS 102-3, the fifth connection between the first BS 102-1 and the fourth BS 102-4 is determined by the fourth BS 102-4 according to the first node identity of the first BS 102-1. In some embodiments, when the second node identity of the first BS 102-1 is received by the fourth BS 102-4 in the second message from the third BS 102-3, a sixth connection between the second BS 102-2 and the fourth BS 102-4 is determined by the fourth BS 102-4 according to the second node identity of the first BS 102-1. In some embodiments, the sixth connection between the second BS 102-2 and the fourth BS 102-4 is for at least one of the following: a migration of the at least one second bearer from the second BS 102-2 to the fourth BS 102-4 and a migration of the at least one first bearer from the first BS 102-2 to the fourth BS 102-4 through the second BS 102-2 when the fifth connection is determined as unestablished between the first BS 102-1 and the fourth BS 102-4. In some embodiments, the fifth and the sixth connection each is a connection on the UP.

The method 400 continues with operation 412 in which a third message is received by the third BS 102-3 from the fourth BS 102-4 according to some embodiments. In some embodiments, the third message is transmitted on the CP through the third connection. In some embodiments, the third message is a SN addition request acknowledgement message. In some embodiments, the third message comprises a first indicator, wherein the first indicator is configured to indicate whether the fifth connection is established between the first BS 102-1 and the fourth BS 102-4. In some embodiments, when the fourth BS 102-4 determines that no fifth connection is established between the first BS 102-1 and the fourth BS 102-4 for the at least one first bearer or when the fourth BS 102-4 determines that the sixth connection is established for the at least one second bearer, the third message comprises a second indicator, wherein the second indicator is configured to indicate whether the sixth connection is established between the second BS 102-2 and the fourth BS 102-4.

In some embodiments, the first and the second indicators each comprises 1 bit. For example, when a value of the first indicator is 1, the fifth connection is established between the first BS 102-1 and the fourth BS 102-4; and when the value of the first indicator is 0, the fifth connection is unestablished between the first BS 102-1 and the fourth BS 102-4. Similarly, when a value of the second indicator is 1, the sixth connection is established between the second BS 102-2 and the fourth BS 102-4; and when the value of the second indicator is 0, the sixth connection is unestablished between the second BS 102-2 and the fourth BS 102-4.

In some embodiments, the third message further comprises at least one first data forwarding address of the fourth BS 102-4 that is for the at least one first bearer from the first BS 102-1. In some embodiments, the at least one first data forwarding address of the fourth BS 102-4 is configured by the fourth BS 102-4. In some embodiments, the third message further comprises the information of the at least one first bearer. In some embodiments, the at least one first data forwarding address each comprises one of the following: information of a General Packet Radio Services (GPRS) tunneling protocol stack for uploading (UL) data forwarding and information of a GPRS tunneling protocol stack for downloading (DL) data forwarding. In some embodiments, the information of a GPRS tunneling protocol stack comprises at least one of the following: a Transport Network Layer (TNL) address, and a tunneling endpoint identifier (TED) of the GPRS tunneling protocol stack.

In some embodiments, when the at least one second bearer is determined to be migrated from the second BS 102-2 to the fourth BS 102-4, the third message further comprises the information of the at least one second bearer. In some embodiments, the at least one first data forwarding address of the fourth BS 102-4 is also configured for the at least one second bearer from the second BS 102-2. Although only 2 middle wireless communication nodes are illustrated in FIG. 4, there can be more nodes between a source node (i.e., the first BS 102-1) and a target node (i.e., the fourth BS 102-4). In this case, the at least one first data forwarding address is for all the bearers that are to be migrated to the fourth BS 102-4.

The method 400 continues with operation 414 in which a fourth message is transmitted from the third BS 102-3 to the second BS 102-2 according to some embodiments. In some embodiments, the fourth message is transmitted on the CP of the second connection. In some embodiments, the fourth message is a handover request acknowledgement message. In some embodiments, the fourth message comprises at least one second data forwarding address of the fourth BS 102-4 for the at least one first bearer. In some embodiments, the at least one second data forwarding address is configured by the third BS 102-3. In some embodiments, when the fifth connection is established between the first BS 102-1 and the fourth BS 102-4 or when the sixth connection is established between the second BS 102-2 and the fourth BS 102-4, the second data forwarding address of the fourth BS 102-4 configured by the third BS 102-3 is the same as the first data forwarding address of the fourth BS 102-4 configured by the fourth BS 102-4. In some other embodiments, when the fifth connection and the sixth connection are not established, the at least one second data forwarding address of the fourth BS 102-4 configured by the third BS 102-3 is different from the first data forwarding address of the fourth BS 102-4 configured by the fourth BS 102-4. In some embodiments, the fourth message further comprises the information of the at least one first bearer.

In some embodiments, when the at least one second bearer is determined to be migrated from the second BS 102-1 to the fourth BS 102-4, the fourth message further comprises the information of the at least one second bearer. In this case, the at least one second data forwarding address is also for the at least one second bearer and the fourth message further comprises the information of the at least one second bearer.

The method 400 continues with operation 416 in which a fifth message is transmitted from the second BS 102-2 to the first BS 102-1 according to some embodiments. In some embodiments, the fifth message is transmitted on the CP of the first connection. In some embodiments, the fifth message is a SN release message. In some other embodiments, the fifth message is an Xn-U address indication message. In some embodiments, the fifth message comprises at least one third data forwarding address of the fourth BS 102-4 for the at least one first bearer. In some embodiments, the at least one third data forwarding address is configured by the second BS 102-2. In some embodiments, when the fourth connection is established between the first BS 102-1 and the third BS 102-3 or when the fifth connection is established between the first BS 102-1 and the fourth BS 102-4, the at least one third data forwarding address of the fourth BS 102-4 configured by the second BS 102-2 is the same as the first data forwarding address of the fourth BS 102-4 configured by the fourth BS 102-4; and when the fifth connection is not established between the first BS 102-1 and the fourth BS 102-4 or when the sixth connection is established between the second BS 102-2 and the fourth BS 102-4, the third data forwarding address of the fourth BS 102-4 configured by the second BS 102-2 is different from the first data forwarding address of the third BS 102-3 configured by the third BS 102-3. In some embodiments, the fifth message further comprises the information of the at least one first bearer.

The method 400 continues with operation 418 in which a sixth message is transmitted from the first BS 102-1 to the fourth BS 102-4 according to some embodiments. In some embodiments, the sixth message is transmitted on the UP of the fifth connection. In some embodiments, the sixth message comprises data on the at least one first bearer to be migrated to the fourth BS 102-4. In some embodiments, when the fifth connection between the first BS 102-1 and the fourth BS 102-4 is established, the sixth message is transmitted according to the at least one first data forwarding address of the fourth BS 102-4. In some embodiments, when the fifth connection is unestablished and the fourth connection is established between the first BS 102-1 and the third BS 102-3, the six message is transmitted on the UP of the fourth connection from the first BS 102-1 to the third BS 102-3 and further to the fourth BS 102-4 through the third connection according to the at least one second data forwarding address configured by the third BS 102-3. In some embodiments, when the fourth or fifth connection is unestablished, and when the sixth connection is established, the six message is transmitted from the first BS 102-1 to the second BS 102-2 on the UP of the second connection and further to the fourth BS 102-4 on the UP of the sixth connection according to the at least one third data forwarding address configured by the second BS 102-2. In some embodiments, when all of the fourth, the fifth or the sixth connection is unestablished, the six message is transmitted according to the third data forwarding address configured by the second BS 102-2 from the first BS 102-1 to the second BS 102-2 through the UP of the first connection, to the third BS 102-3 on the UP of the second connection, and further to the fourth BS 102-4 on the UP of the third connection.

In some other embodiments, the sixth message comprises data on the at least one second bearer. In some embodiments, when the sixth connection is established, the six message is transmitted according to the first data forwarding address configured by the fourth BS 102-4 from the second BS 102-2 to the fourth BS 102-4. In some embodiments, when the sixth connection is unestablished, the six message is transmitted according to the second data forwarding address configured by the third BS 102-3 from the second BS 102-2 to the third BS 102-3 on the UP of the second connection and further to the fourth BS 102-4 on the UP of the third connection.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method for performing a data forwarding by a first wireless communication node, comprising:
   receiving a first message from a third wireless communication node between the first wireless communication node and a second wireless communication node, wherein the first message comprises a first node identity of the second wireless communication node and at least one first corresponding bearer to be migrated from the second wireless communication node to the first wireless communication node;
   determining a first connection for the at least one first corresponding bearer to be migrated from the second wireless communication node to the first wireless communication node according to the first node identity;
   transmitting a second message to the third wireless communication node, wherein the second message comprises at least one first data forwarding address of the first wireless communication node; and
   receiving a third message from the second wireless communication node through the first connection, wherein the third message comprises the at least one first corresponding bearer.

2. The method of claim 1, wherein the first message further comprises information of the at least one first corresponding bearer, wherein the at least one first corresponding bearer is determined to be migrated from the second wireless communication node to the first wireless communication node according to the at least one first data forwarding address.

3. The method of claim 1, wherein the first message further comprises a second node identity of the first middle wireless communication node.

4. The method of claim 1, wherein the first node identity comprises at least one of: a global node identity (GNID) of the second wireless communication node, an identity of a user plane, or an identity of a control plane.

5. The method of claim 1, wherein the first connection is through one of the following: an X2 interface, an Xn interface, a S1 interface, an Ng interface, an E1 interface, and a F1 interface.

6. The method of claim 1, wherein the at least one first data forwarding address in the second message comprises at least one of the following: information of a General Packet Radio Services (GPRS) tunneling protocol stack for uploading (UL) data forwarding and information of a GPRS tunneling protocol stack for downloading (DL) data forwarding.

7. The method of claim 6, wherein the information of a GPRS tunneling protocol stack comprises at least one of the following: a Transport Network Layer (TNL) address, and a tunneling endpoint identifier (TEID) of the GPRS tunneling protocol stack.

8. The method of claim 1, further comprising:
   receiving at least one second corresponding bearer from the first middle wireless communication node.

9. The method of claim 8, wherein the at least one second corresponding bearer is determined to be migrated from the second wireless communication node to the first wireless communication node according to at least one second data forwarding address, wherein the at least one second data forwarding address is determined by the third wireless communication node.

10. The method of claim 1, further comprising:
    receiving at least one second corresponding bearer from a fourth wireless communication node between the first wireless communication node and the second wireless communication node.

11. The method of claim 10, wherein the at least one second corresponding bearer is received by the fourth wireless communication node from the second wireless communication node according to at least one second data forwarding address, wherein the at least one second data forwarding address is determined by the fourth wireless communication node according to the first node identity of the second wireless communication node, wherein the first node identity is used to determine at least one second connection between the second wireless communication node and the fourth wireless communication node for the at least one second corresponding bearer.

12. The method of claim 10, wherein the at least one second corresponding bearer is received by the fourth wireless communication node from a fifth wireless communication node between the first communication node and the second communication node according to at least one second data forwarding address, wherein the at least one second data forwarding address is determined by the fourth wireless communication node according to a second node identity of the fifth wireless communication node, wherein the second node identity is used to determine at least on second connection between the fourth wireless communication node and the fifth wireless communication node for the at least one second corresponding bearer.

13. The method of claim 12, wherein the at least one second connection is through one of the following: an X2 interface, an Xn interface, a S1 interface, an Ng interface, an E1 interface, and a F1 interface.

14. A method for performing a data forwarding by a third wireless communication node between a first wireless communication node and a second wireless communication node, comprising:
    transmitting a first message to the first wireless communication node, wherein the first message comprises a first node identity of the second wireless communication node and at least one first corresponding bearer to be migrated from the second wireless communication node to the first wireless communication node,
    wherein the first wireless communication node determines a first connection for the at least one first corresponding bearer to be migrated from the second wireless communication node to the first wireless communication node according to the first node identity; and
    receiving a second message from the first wireless communication node, wherein the second message comprises at least one first data forwarding address of the first wireless communication node, and
    wherein the first wireless communication node receives a third message from the second wireless communication node through the first connection, wherein the third message comprises that at least one first corresponding bearer.

15. The method of claim 14, wherein the first node identity of the first wireless communication node is received by the second wireless communication node through the third wireless communication node.

16. The method of claim 14, wherein the first node identity comprises a global node identity (GNID) of the first wireless communication node.

17. The method of claim 14, wherein the first node identity further comprises one of the following: an identity of a user plane and an identity of a control plane.

18. The method of claim 14, wherein the first connection is through one of the following: an X2 interface, an Xn interface, a S1 interface, an Ng interface, an E1 interface, and a F1 interface.

19. A first communication node comprising:
    at least one processor and a transceiver, wherein:
    the transceiver is configured to receive a first message from a third wireless communication node between the first wireless communication node and a second wireless communication node, wherein the first message comprises a first node identity of the second wireless communication node and at least one first corresponding bearer to be migrated from the second wireless communication node to the first wireless communication node;
    the at least one processor is configured to determine a first connectin for the at least one first corresponding bearer to be migrated from the second wireless communication node to the first wireless communication node according to the first node identity;
    the transceiver is further configured to transmit a second message to the third wireless communication node, wherein the second message comprises at least one first data forwarding address of the first wireless communication node; and
    the transceiver is further configured to receive a third message from the second wireless communication node through the first connection, wherein the third message comprises the at least one first corresponding bearer.

* * * * *